Sept. 10, 1946. G. T. RANDOL Re 22,791
CONTROL MEANS FOR CHANGE-SPEED TRANSMISSIONS
Original Filed Feb. 27, 1941 5 Sheets-Sheet 1
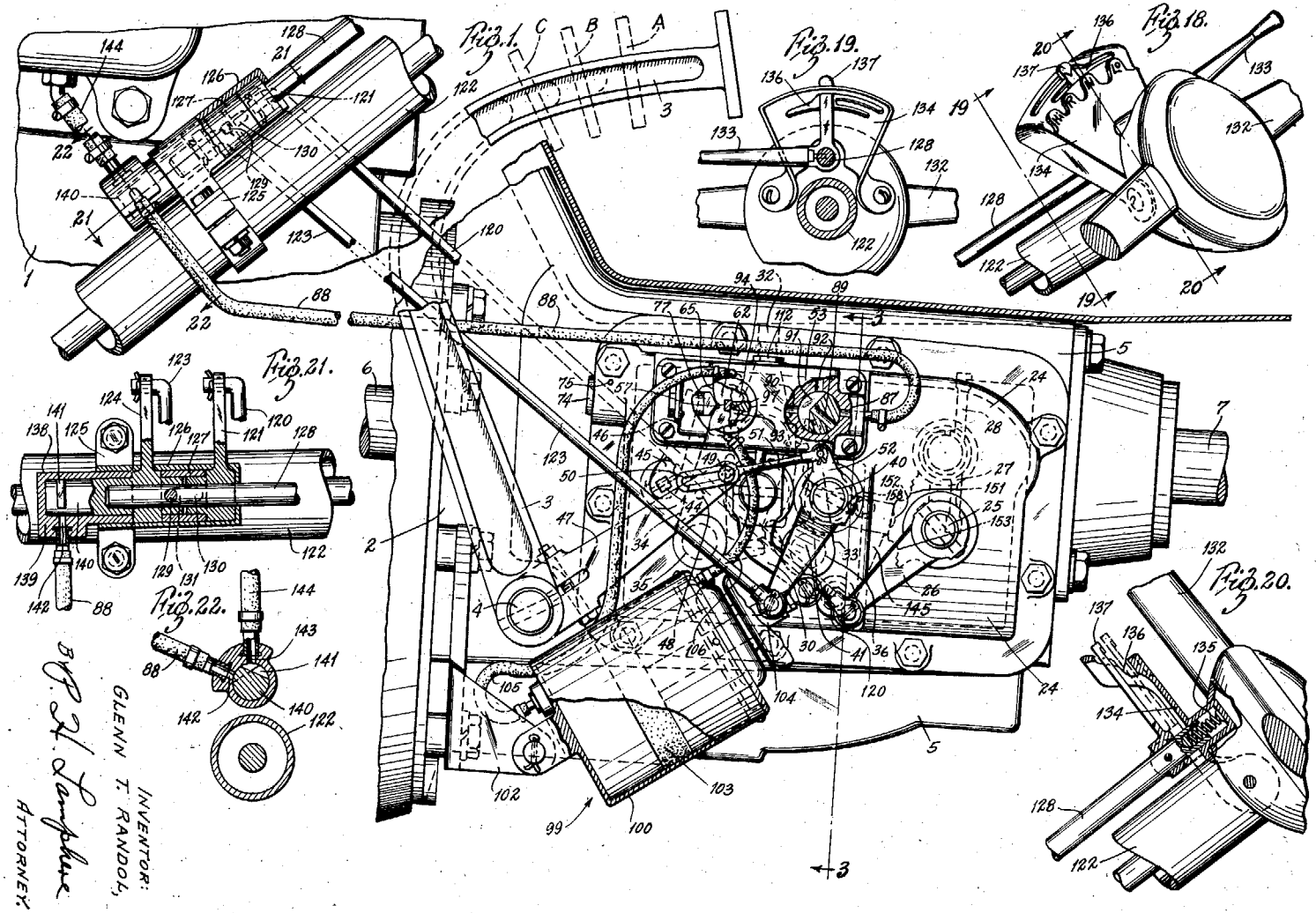
INVENTOR:
GLENN T. RANDOL,
BY P. H. Lamphere
ATTORNEY.

Sept. 10, 1946. G. T. RANDOL Re 22,791
CONTROL MEANS FOR CHANGE-SPEED TRANSMISSIONS
Original Filed Feb. 27, 1941. 5 Sheets-Sheet 2
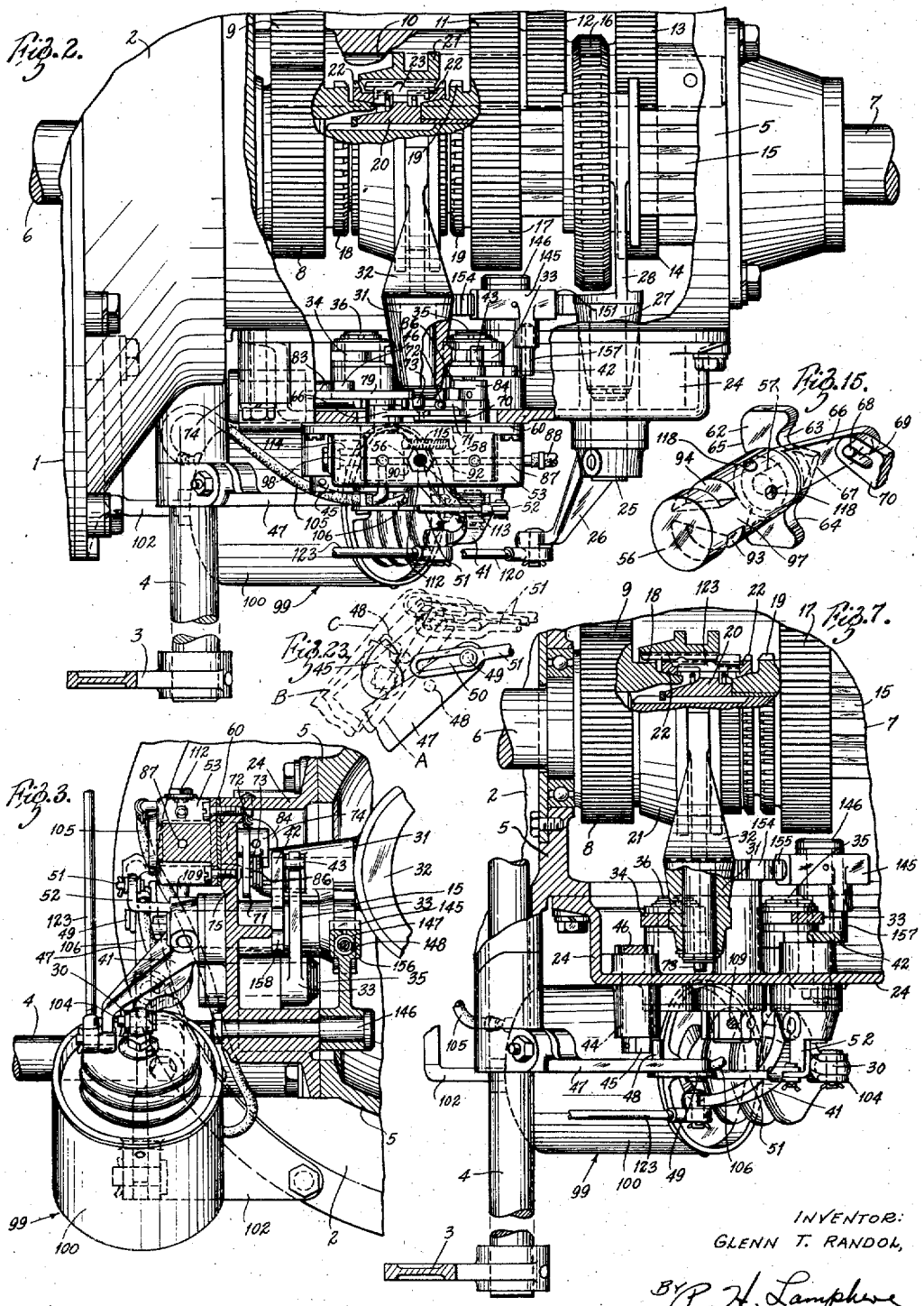
INVENTOR:
GLENN T. RANDOL,
BY P. H. Lamphere
ATTORNEY.

Sept. 10, 1946. G. T. RANDOL Re 22,791

CONTROL MEANS FOR CHANGE-SPEED TRANSMISSIONS

Original Filed Feb. 27, 1941 5 Sheets-Sheet 3

INVENTOR:
GLENN T. RANDOL,

BY P. H. Lamphere
ATTORNEY.

Sept. 10, 1946. G. T. RANDOL Re 22,791

CONTROL MEANS FOR CHANGE-SPEED TRANSMISSIONS

Original Filed Feb. 27, 1941 5 Sheets-Sheet 4

INVENTOR:
GLENN T. RANDOL,
By P. H. Lamphere
ATTORNEY.

CONTROL MEANS FOR CHANGE-SPEED TRANSMISSIONS
Original Filed Feb. 27, 1941 5 Sheets-Sheet 5
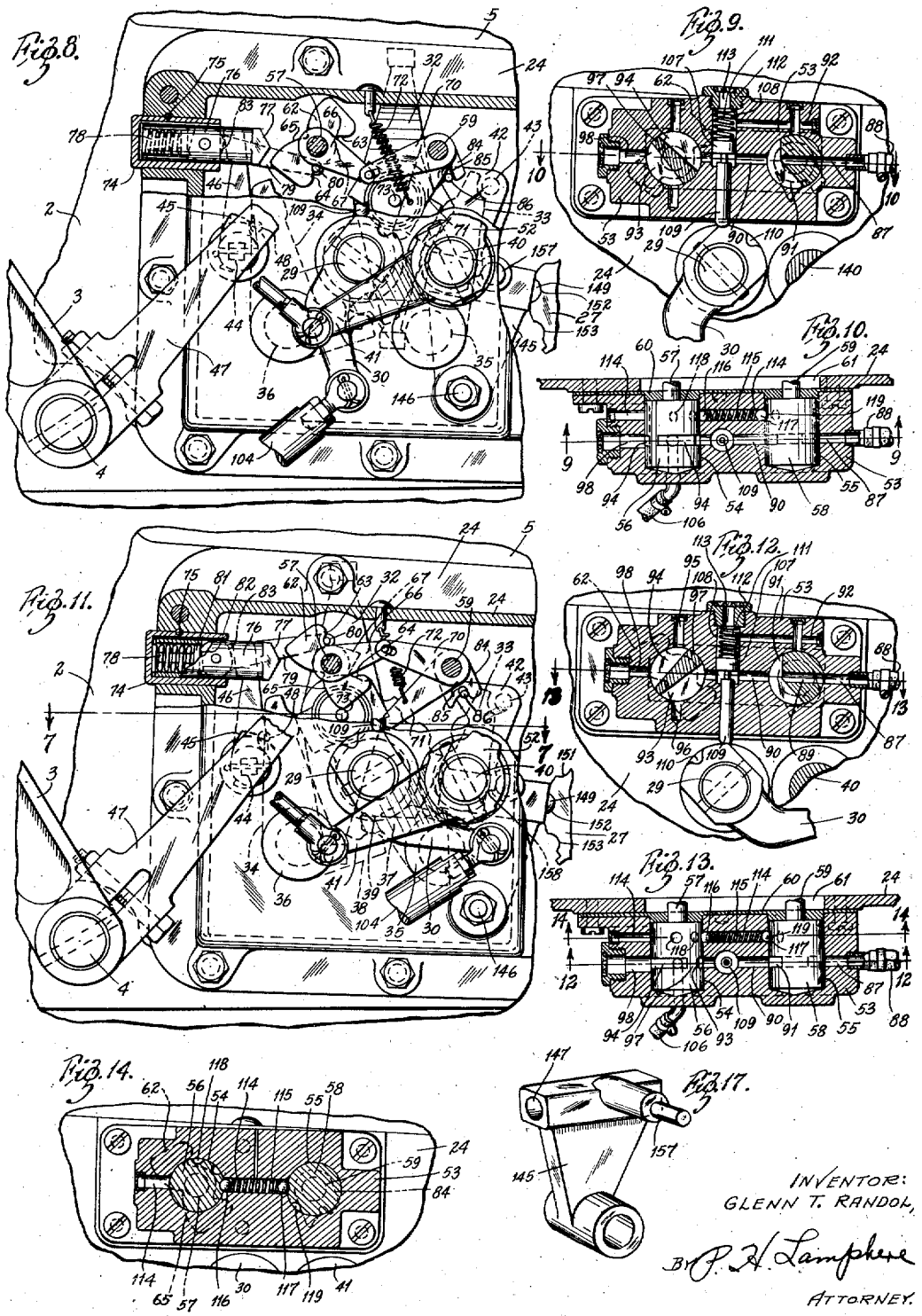
INVENTOR:
GLENN T. RANDOL,
BY P. H. Lamphere
ATTORNEY.

Reissued Sept. 10, 1946

Re. 22,791

UNITED STATES PATENT OFFICE 22,791

CONTROL MEANS FOR CHANGE-SPEED TRANSMISSIONS

Glenn T. Randol, St. Louis, Mo.

Original No. 2,351,067, dated June 13, 1944, Serial No. 380,752, February 27, 1941. Application for reissue August 7, 1944, Serial No. 548,493

54 Claims. (Cl. 192—3.5)

Figure 4:
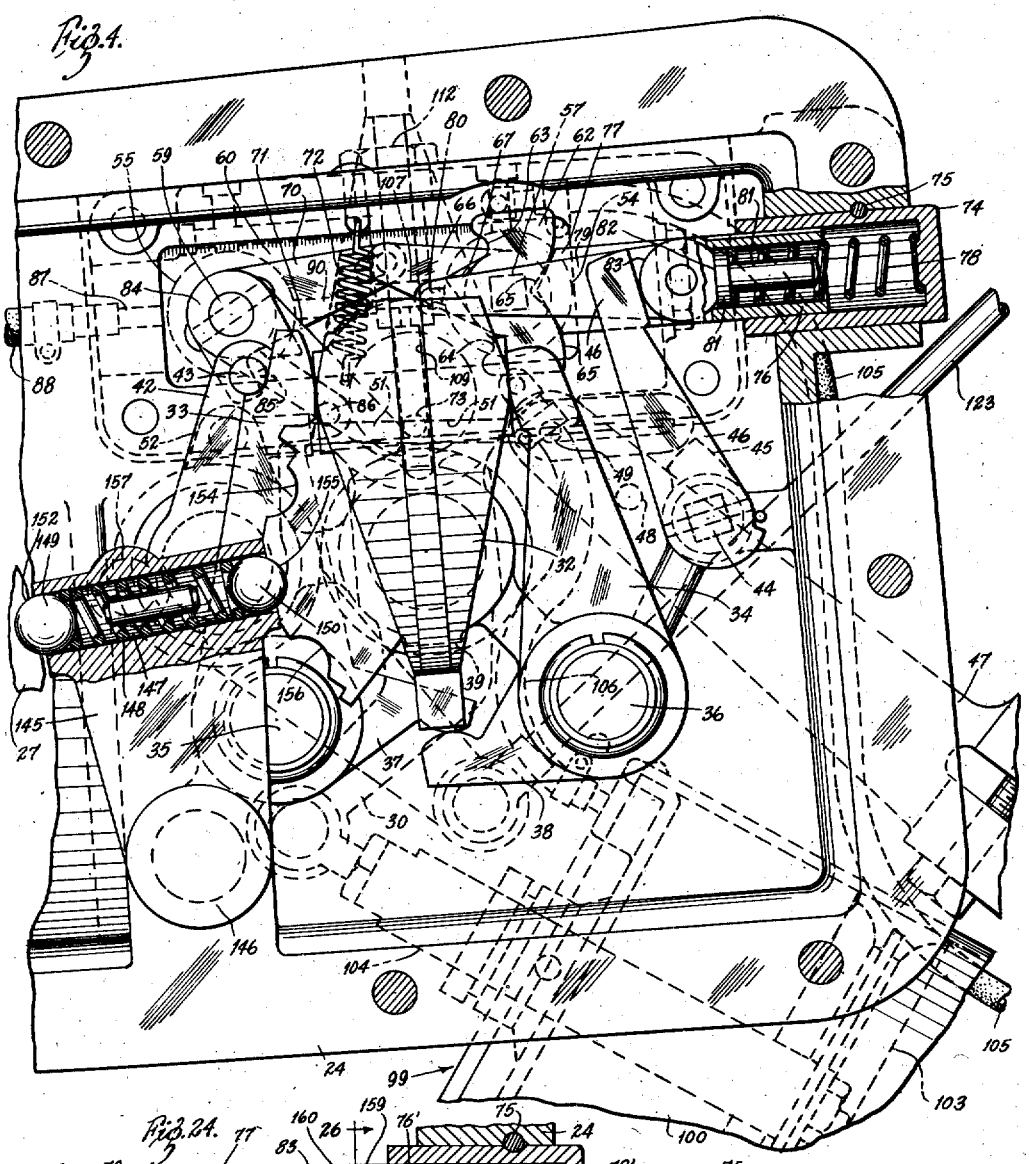

My invention relates to change speed gearing and more particularly to improved means for controlling the changing of the speed ratios thereof.

One of the objects of my invention is to provide a control mechanism for a change speed gearing which will permit certain gear ratios to be selected as a group at the will of the operator and caused to be individually active by controlled power means.

Another and more specific object of my invention is to provide improved control means for a change speed gearing which will permit the operator to select second and high gear ratios by a hand lever and to alternately cause the ratios to be operative by successive clutch disengaging and re-engaging movements of the clutch pedal or equivalent member.

Still another object of my invention is to provide means whereby said hand lever may be employed to manually engage elements establishing other gear ratios such as low and reverse.

Yet another object of my invention is to provide in a motor vehicle improved power-operated means for shifting elements of a change speed gearing and to control said means in accordance with the will of the vehicle operator.

Another object of my invention is to provide in a control mechanism for a change speed gearing having its shiftable elements actuated by power means, a manual means for positively neutralizing the gearing at any time.

A further object of my invention is to provide improved control means for three forward speeds and a reverse gearing which can be readily associated therewith and by means thereof permit manual shifting of the low and reverse speed ratio elements and power shifting of the second and high speed ratio elements at the will of the operator.

Another object of my invention is to provide a control mechanism for a change speed gearing wherein a hand lever when placed in one position will permit power shifting means to be operative at the will of the operator and when placed in another position will positively cause the gearing to be neutralized and the power means to be disabled.

A still further object of my invention is to provide power shifting means for the shiftable elements of two speed ratios of a change speed gearing which is so controlled by a manually-operated member that the speed ratios will be caused to be alternately operative by successive movements of the manually-operated member from one position to another position and return.

A more specific object of my invention is to provide a differential fluid pressure operated means for shifting the elements of a change speed gearing with valve means and control means therefor which will permit two speed ratios to be caused to be alternately operative by the fluid-operated means in accordance with successive movements of a single operator-operated member which is connected to actuate the valve.

Yet another object of my invention is to provide in a power-actuated shifting mechanism for a change speed gearing means permitting the gearing to be neutralized either by a hand lever, by a foot lever or by one with the assistance of the other and also means permitting the power means and hand lever to assist each other in neutralizing the gearing.

A further object of my invention is to provide a semi-automatic control mechanism for a conventional automobile change speed gearing having three forward speed ratios and a reverse gearing which will facilitate simplified driving of the automobile, will be cheap to manufacture, easy to install, and be operable in a manner that will not require unusual special knowledge.

Figure 24:
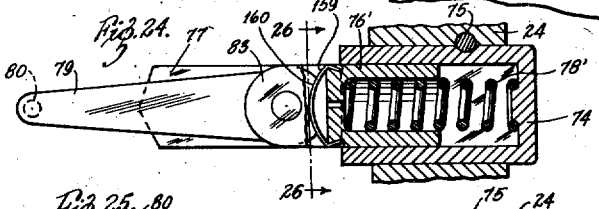
Figure 25:
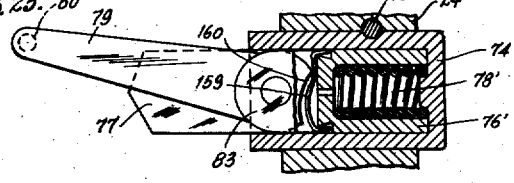
Figure 26:
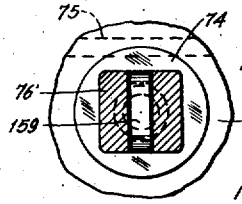
Figure 5:
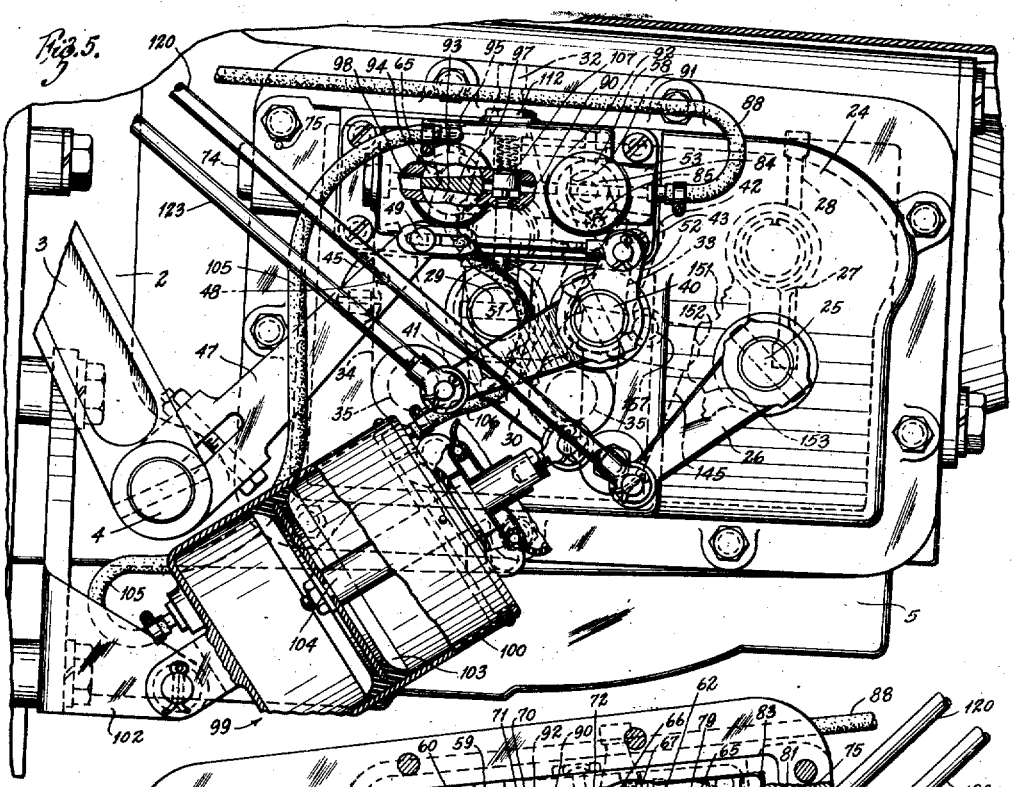
Figure 6:
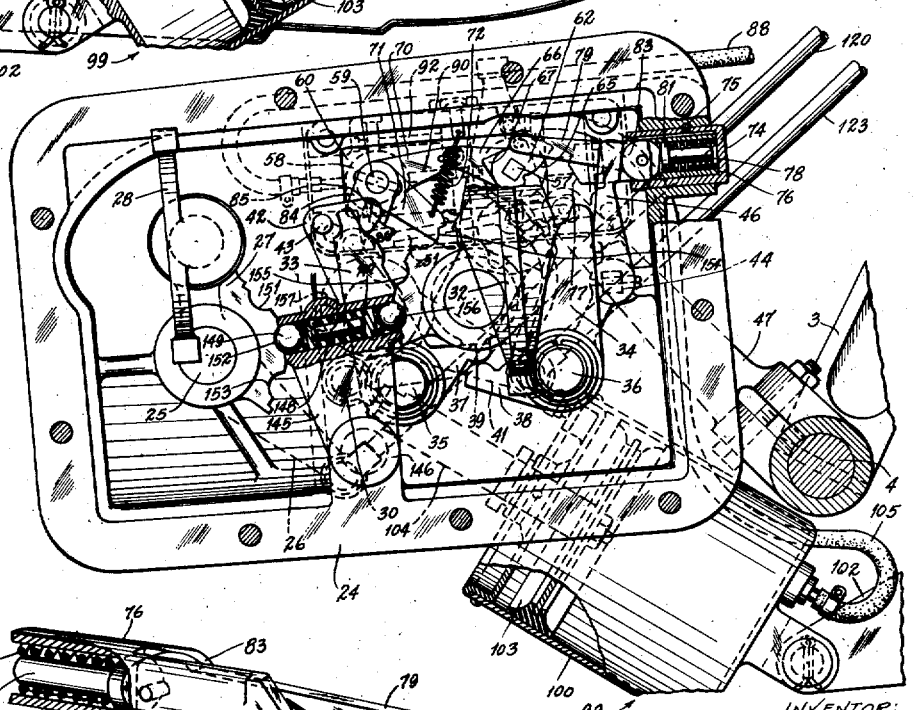
Figure 16:
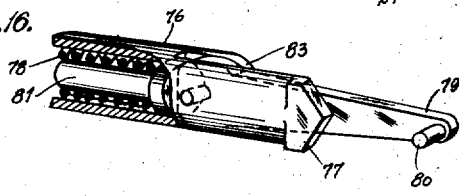

Other objects of my invention will become apparent from the following description taken in connection with the accompanying drawings in which Figure 1 is a side view of a portion of a motor vehicle including a change speed transmission showing a control mechanism associated therewith and embodying my invention, the parts being in neutral position; Figure 2 is a top view of the gearing and control mechanism with the shiftable elements of the gearing in neutral position; Figure 3 is a sectional view taken on the line 3—3 of Figure 1; Figure 4 is an enlarged view of the parts on the inside of the closure plate, said parts corresponding to neutral condition of the gearing; Figure 5 is an enlarged side view of the transmission and control mechanism similar to Figure 1 but with the hand lever set in position selecting second and high speeds and clutch pedal in clutch disengaged position; Figure 6 is another view of the parts as viewed from the inside of the closure plate, said parts being in high gear position; Figure 7 is a sectional view similar to Figure 2 but with the parts in high gear position, said view being taken on the line 7—7 of Figure 11; Figure 8 is a view similar to Figure 5 but with parts broken away, said view showing the valve control mechanism and the parts in second gear position; Figure 9 is a sectional view of the valve structures, said view being taken on the line 9—9 of Figure 10 and showing the parts in second gear position; Figure 10 is a sectional view taken on the line 10—10 of Figure 9; Figure 11 is a view similar to Figure 8 but showing the valve controlling mechanism and the parts in high gear position; Figure 12 is a sectional view similar to Figure 9 showing the position of the valve structures in high gear position, said view being taken on the line 12—12 of Figure 13; Figure 13 is a view taken on the line 13—13 of Figure 12; Figure 14 is a view taken on the line 13—13 of Figure 13; Figure 15 is a perspective view of the distributing valve member and associated levers; Figure 16 is a perspective view of the slidable means for actuating the distributing valve element; Figure 17 is a perspective view of the interlocking member; Figure 18 is a perspective view showing the hand control lever and associated indicating bracket as mounted on the steering column. Figure 19 is a sectional view taken on the line 19—19 of Figure 18; Figure 20 is a sectional view taken on the line 20—20 of Figure 18; Figure 21 is a sectional view taken on the line 21—21 of Figure 1, showing details of the primary shut-off valve; Figure 22 is a sectional view taken on the line 22—22 of Figure 1; Figure 23 is a detail view of the end of the clutch pedal arm and associated parts showing them in various positions; Figures 24 and 25 are sectional views of a modified spring control means for the plunger and selecting finger for actuating the distributing valve element showing said finger in different positions; and Figure 26 is a sectional view taken on the line 26—26 of Figure 24.

Referring particularly to Figures 1 and 2, the numeral 1 indicates the engine for driving a motor vehicle, this engine being connected to the wheels of the vehicle by means of the usual clutch (not shown) enclosed within the housing 2 and the change speed gearing. The gearing is connected through suitable shafting and a differential gear (not shown) to the vehicle wheels as is the usual practice. A clutch pedal 3 secured to the outer end of a shaft 4 controls the engaging and disengaging of the clutch. The change speed gearing is embodied in a housing 5 in which is journaled the driving shaft 6 (connected to one element of the main clutch) and the axially aligned driven shaft 7. The portion of the driving shaft within the gearing housing has secured thereto a gear 8 constantly meshing with a gear 9 of a cluster of gears mounted on a counter-shaft 10 journaled in the housing at one side of the driving and driven shafts. The cluster of gears, in addition to the gear 9, includes a second speed gear 11, a low speed gear 12, and a reverse speed gear 13, the latter being in constant mesh with an idler gear 14. A portion of the driven shaft 7 which extends into the housing is provided with splines 15 upon which is slidably mounted a combined low and reverse gear 16, said gear, when moved forward, meshing with the gear 12 to obtain low speed ratio, and when moved rearwardly, meshing with gear 14 to obtain reverse gear drive.

The driven shaft 7 ahead of the splined portion has rotatably mounted thereon a second speed gear 17 which is in constant mesh with the second speed gear 11 on the countershaft. The second speed gear 17 is connected to the driven shaft and the driven shaft is connected to the driving shaft in a selective manner by means of a combined clutch and synchronizing means. This structure is well known and need only be briefly described. As best shown in Figures 2 and 7, clutch teeth 18 are provided on the driving shaft and clutch teeth 19 are provided on the gear 17, said teeth being in opposed spaced relation. The portion of the driven shaft between the clutch teeth has secured thereto a splined sleeve 20 having thereon a slidable and non-rotatable clutch collar 21 provided with internal teeth for cooperating with teeth 18 when the sleeve is moved forwardly, or for cooperating with teeth 19 when moved rearwardly. The synchronizing means which is employed to bring either the teeth 18 or 19 and the internal teeth of the collar 21 to substantially the same speed at the time they are engaged comprises synchronizing members 22, one associated with the driven shaft teeth 18 and the other associated with teeth 19 on the second speed gear. Between these two synchronizing members are operating members 23 which lie beneath the clutch collar 21 for operation thereby. Thus when the collar is moved forwardly to engage teeth 18, members 23 will be operated to first operate the synchronizing member 22 to frictionally connect the drive and driven shafts together, and then subsequently permit the movement of the collar through the teeth of the synchronizing member to a position engaging teeth 19. Similarly, when collar 21 is moved rearwardly, members 23 will be operated to move the synchronizing member 22 so as to frictionally connect gear 17 to the driven shaft and then subsequently permit the teeth of the clutch collar to pass through the teeth of the synchronizing member and engage teeth 19. In Figure 2 the clutch collar 21 is disengaged from both teeth 18 and 19 and in Figure 7 the clutch collar is shown as being moved forwardly to a position where the driving shaft is directly connected to the driven shaft.

In accordance with my invention I have provided improved means for shifting the collar 21 and the combined low and reverse gear 16 in order to properly control change of speed ratios of the transmission. On the side closure plate 24 for the gear housing 5 there is journaled a shaft 25 (best shown in Figures 1, 5 and 6) which extends to the exterior of the closure plate and has pinned thereto an operating arm 26. To this shaft is secured, as by welding, an upwardly extending arm 27 in which is pivoted a shifting fork 28 engaging in an annular groove in the combined low and reverse gear 16. Thus, when the arm 26 is moved to rotate shaft 25 in a counterclockwise direction, as viewed from the exterior of the closure plate, shifting fork 28 will be so moved as to place the gear 16 in mesh with gear 12 to obtain low speed ratio, and when the arm is turned in the opposite direction, the shifting fork will move to cause gear 16 to be placed in mesh with the idler gear 14 to obtain reverse gear ratio.

Also journaled in the closure plate forwardly of the shaft 25 is a second shaft 29 and secured to the outer end thereof is a second arm 30 for rotating the shaft. The inner end of the shaft has secured thereto, as by welding, an upwardly extending arm 31 in which is pivotally mounted a shifting fork 32 engaging in a groove in clutch collar 21. Thus when the shaft 29 is rotated in a counter-clockwise direction, as viewed from the exterior of the closure plate, collar 21 will be moved forwardly to cause the driving shaft 6 to be connected directly to the driven shaft 7 to provide direct or high speed ratio, and when the shaft 29 is rotated in the opposite direction the collar will be moved rearwardly to cause gear 17 to be connected to the driven shaft to provide second speed ratio.

As best shown in Figures 4 and 6, (views of the inside of the closure plate) the closure plate has mounted thereon two companion levers 33 and 34 by means of pivot pins 35 and 36, respectively. These levers extend upwardly on opposite sides of arm 31 pivotally carrying the shifting fork 32. The lever 33 is provided with an integral arm 37 and lever 34 is provided with an integral arm 38, these arms extending toward each other and having their ends in overlapping relation with arm 37 lying above arm 38. By means of this construction, when the lever 33 is moved in a clockwise direction, as viewed in Figure 5, lever 34 will be caused to be moved in a counter-clockwise direction and toward the lever 33. The arms 37 and 38 lie directly below the boss of shaft 29 and this boss is provided with a flat surface 39 which is adapted to be engaged by arm 37 to limit the rotative movement of the two levers 33 and 34 away from each other. The extent of movement of the levers toward each other is limited by the shifting fork carrying arm 31 which lies between said levers. The levers are spread apart when fork 32 is moved from its neutral position in either direction to cause second and high speed ratios to be effective. If the levers are moved toward each other when the fork is on either side of its central or neutral positions, arm 31 will be engaged and the fork will be moved to its central position. Thus it is seen that if the fork is in a position causing a gear ratio to be active, the transmission can be neutralized by the movement of the levers toward each other.

Also journaled in the closure plate is a shaft 40 which is positioned rearwardly of shaft 29 and above pin 35 upon which lever 33 is pivoted. The outer end of this shaft has secured thereto an arm 41. Also, the inner end of the shaft has secured thereto an arm 42 which extends upwardly between the closure plate and the lever 33. Carried on this arm is a pin 43 for cooperation with the end of lever 33 whereby when shaft 40 is moved in a counter-clockwise direction, as viewed from the exterior of the closure plate, pin 43 will pick up lever 33 after a lost motion movement and rotate it with arm 42, thus causing levers 33 and 34 to be moved toward each other.

At the forward end of the closure plate is journaled a shaft 44 having secured to its outer end a detachable short arm 45 and to its inner end an integral longer arm 46. Shaft 44 is adapted to be rotated in a counter-clockwise direction by means of clutch pedal 3, the structure for accomplishing this comprising an arm 47 secured to shaft 4 and extending upwardly adjacent the short arm 45. This arm carries a pin 48 for engagement with the arm 45. The relationship between arm 47 and arm 45 is such that the pin will not engage the arm 45 until the clutch pedal has been moved to a position just disengaging the clutch. This relationship is best shown in Figure 23 wherein the full lines show the arm 47 in the position it assumes when the clutch pedal is in clutch-engaged position. When the clutch is fully disengaged, arm 47 will be moved to the first dotted line position "A" thus bringing pin 48 into engagement with arm 45. Additional movement of the clutch which will bring the arm 47 to the second dotted position "B" will cause rotation of arm 45 and also arm 46 in a counter-clockwise direction. In the event the clutch pedal is depressed still further in order to cause arm 47 to assume a third position, shown by the dotted line "C," pin 48 will ride over the end of arm 45 and no longer cause movement of this arm. The positions of the clutch pedal corresponding to positions "A," "B" and "C" of arm 47, are shown in dotted lines in Figure 1 and similarly marked. The extreme end of arm 47, which extends beyond pin 48, carries a pin 49 which is received in a slot 50 at one end of link 51, this link having its other end pivotally connected to a short arm 52 extending upwardly from arm 37 previously referred to and secured to the outer end of shaft 40. This connecting structure is for the purpose of permitting arm 47 to rotate shaft 40 in a counter-clockwise direction (as viewed from the exterior of the cover plate) under certain conditions and then only when arm 47 is moved from the dotted position "B" to the dotted position "C." These conditions will be later described in connection with the operation of the mechanism.

On the upper forward corner of the exterior of the closure plate 24 there is mounted a valve housing 53 provided with parallel bores 54 and 55 opening toward the gearing housing. In bore 54 there is positioned a cylindrical valve element 56 having an actuating extension 57 and in bore 55 there is positioned a cylindrical valve element 58 having an actuating extension 59. These valve elements are held in the bores by a plate 60 interposed between the valve housing and the closure plate which has an opening 61 through which the extensions 57 and 59 project. The valve controlled by valve element 56 will hereinafter be referred to as a distributing valve and the valve controlled by valve element 58 will hereinafter be referred to as the secondary shut-off valve.

The inner end of projection 57 has secured thereto a double arm actuating member 62 formed with depressions 63 and 64 on one edge and a single large V-shaped recess 65 on its other edge. Loosely mounted on extension 57, between member 62 and the plate 60, is an arm 66 provided with a V-shaped selecting cam surface 67 (see Figures 4 and 15). The outer end of arm 66 is provided with a pin 68 which is adapted to cooperate with an elongated slot 69 in the end of a second arm 70 which is loosely mounted on projection 59 of valve element 58. Also loosely mounted on the projection 59 but secured against relative movement with respect to arm 70, is still another arm 71 which is angularly related to arm 70 and extends downwardly from the projection 59. A spring 72 is connected to arm 71 and the closure plate 24 for causing the connected arms 70 and 71 to be rotated in a counter-clockwise direction as viewed from the exterior of the closure plate (see Figures 8 and 11). The lever 71 lies adjacent the end of the shifting fork 32 which is pivoted in the arm 31 and this portion of the shifting fork is provided with a pin 73 which is adapted to cooperate with lever 71 and prevent its rotation in a clockwise direction when the shifting fork is in a position to cause second speed ratio to be active (see Figure 8). When the shifting fork is in high speed position, pin 73 will be so positioned that it will not interfere with the rotative movement of arm 71 and, therefore, this arm and arm 70 will be rotated under the action of the spring in a clockwise direction. Figure 11 shows the shifting fork and position of the pin 73 when the transmission is in high speed ratio with the clutch pedal depressed.

In the upper front end of the closure plate there is mounted a sleeve 74 fixed against rotation by means of a stake pin 75. Slidable in this sleeve is a plunger 76 provided with a V-shaped nose 77 at its outer end and in the same plane as the double arm member 62 for cooperation with the V-shaped recess 65 of said member. The spring 78 biases the plunger toward member 62 and when free to engage said member will cause it to assume a position to place the distributing valve element 56 in its normal or neutral position (see Figure 4). Pivotally mounted on plunger 76 is a selecting finger 79 which extends beyond the end of the plunger and is provided at its free end with a pin 80 which is adapted to cooperate with the V-shaped selecting cam surface 67 carried on arm 66. The finger is normally held in an axial position with respect to the plunger by means of spring 78 which cooperates with a small plunger 81 and forces it against the flat end 82 of the finger. The finger, however, may swing on its pivot under the action of an external force but if freed from this force, it will always axially align itself with the plunger as is obvious from the construction (see Figure 4). The pin 80 on the end of the finger is of such length as to also have selective cooperation with either of the depressions 63 or 64 in the double arm member 62. If it cooperates with depression 63, it can rotate the double arm member 62 and also valve element 56 in a counter-clockwise direction. If it cooperates with depression 64, it can rotate the valve element in a clockwise direction. The depression it will engage is dependent upon the position of the selecting V-shaped cam 67. The plunger 76 and finger 79 pivoted thereon are adapted to be actuated by arm 46 previously referred to, said arm extending upwardly alongside shoulder 83 on the plunger. When the plunger is moved by spring 78 the V-shaped nose will engage member 62, as previously noted, and pin 80 on the end of finger 79 will extend beyond the apex of the V-shaped cam 67. This relationship is shown in Figure 4.

The projection 59 on the valve element 58 has secured thereto a short actuating arm 84 provided with a slot 85. This arm extends downwardly and alongside the upper end of arm 42 which, as previously described, is secured to and actuated by shaft 40. The arm 42 carries a pin 86 which can engage in slot 85 to actuate arm 84 and consequently the valve element 58. The end of arm 84 and the slot 85 are so formed that pin 86 will pick up the arm and actuate it only during a portion of the movement of arm 42. Thus when arm 42 is rotated in a clockwise direction from its normal inoperative position shown in Figure 1, it will move relatively to arm 84 and then pin 86 will engage slot 85 to pick up arm 84 and move valve element 58 to its open position as shown in Figures 9 and 12.

As best shown in Figures 9, 10, 12 and 13, the rear end of valve casing 53 is provided with a passage 87 for placing bore 55 in communication with a conduit 88 which is adapted to be placed in communication with a suitable source of suction, such as the manifold of the internal combustion engine. The valve element 58 is provided with a cross passage 89 for connecting passage 87 with a passage 90 leading to bore 54. The valve element is also provided with a slot 91 whereby the passage 90 can be connected to an atmospheric passage 92 so that when the valve element is turned to a position where the cross passage 89 is out of alignment with passage 87, passage 90 will be in communication with the atmosphere. The normal inoperative position of the valve corresponding to neutral position of the gearing is as shown in Figure 1 whereby passage 90 is connected to atmosphere through passages 92 and 108. When valve element 58 is rotated by arm 42, it will be in the position shown in Figures 9 and 12 wherein passage 90 is connected to conduit 88.

The valve element 56 in bore 54 is provided with two slots 93 and 94 whereby the valve element may cause the passage 90 to be connected to either passage 95 or 96 in the valve casing, depending upon the position of the valve element. The slots 93 and 94 are so formed as to leave a wedge-shaped portion 97 which can shut off passage 90 and, when in this shut off position, permit passages 95 and 96 to be in simultaneous communication with the atmosphere through a passage 98 which communicates with bore 55 opposite passage 90.

Positioned below the closure plate on the outside thereof is a suction motor 99 which is connected to actuate arm 30 and, by means of shaft 29, the shifting fork 32 for controlling the second and high speed ratios as previously described. This fluid motor comprises a cylinder 100 pivotally mounted on a bracket 102 secured to the clutch housing 2. Within the cylinder is a piston 103 and secured thereto is a piston rod 104 which is pivotally connected to arm 30. This piston 103 is positioned at the center of the cylinder when the shifting fork 32 is in its neutral position. The lower end of the cylinder is connected by means of a conduit 105 to the passage 95 in the valve casing, and the upper end of the cylinder is adapted to be connected by a conduit 106 with passage 96 of the valve casing associated with the distributing valve element. When the source of suction is connected to the cylinder by conduit 105 and atmosphere is connected to the cylinder by conduit 106, the piston will be caused to move to the lower end of the cylinder and the shifting fork 32 will be so moved as to place the gearing in second speed ratio. When the source of suction is connected to the upper end of the cylinder and atmosphere is connected to the lower end of the cylinder, the piston will be moved to the upper end of the cylinder and cause the shifting fork to be moved to a position to cause the gearing to be in high speed ratio.

Passage 90 between bores 54 and 55 has associated therewith a valve element 107 lying in a bore 108. The valve element has an extension 109 which projects out of the valve housing 53 and cooperates with the hub of arm 30 secured to the outer end of shaft 29. This hub is provided with a small depression 110 into which the extension can move when arm 30 is in its neutral position. When the extension is in the depression 110, valve 107 is forced downwardly under the action of a spring 111 and thus restricts the flow of air through passage 90, the restricting position being shown in Figure 4. When arm 30 is in either of its second or high speed ratio positions, the hub of lever 30 will hold valve 107 in an upper position so as not to restrict the passage 90 (see Figures 9 and 12). The spring 111 is backed by a plug 112 having an opening 113 therethrough which places the bore in communication with the atmosphere. The passage 92, previously referred to as leading to the atmosphere, communicates with the atmosphere through the upper end of bore 108.

In order that the two cylindrical valve elements 56 and 58 may be yieldably held in their different operative positions, there is positioned in a bore 114 of the valve casing a spring 115 acting upon balls 116 and 117 (see Figures 10, 13 and 14). Suitably positioned recesses 118 in the surface of valve element 56 and other recesses 119 in the surface of valve element 58 cooperate with the balls and thus insure that the valve elements will be yieldably held in their different operative positions.

The arm 26 on the exterior of the shaft 25 which controls the low and reverse speed shifting fork is connected by a link 120 to an arm 121 pivoted on the lower end of the steering column 122. Similarly, the arm 41 for rotating shaft 40 is connected by a link 123 with arm 124 pivotally mounted on the steering column adjacent arm 108. The mounting of arms 121 and 124 includes a bracket 125 secured to the steering column and provided with a bearing sleeve 126 in which the hubs of the arms are mounted. A spacer sleeve 127 maintains the hubs of the arms in spaced relationship. These hubs receive the lower end of a rod 128 which is both rotatable and longitudinally slidable. The rod carries a pin 129 which is adapted to selectively cooperate with slots 130 and 131 in the hubs of arms 121 and 124, respectively. Thus the rod 128 can be selectively connected with either of the arms 121 or 124 by a reciprocable movement. When either of these arms is connected to the rod it may be rotated by means of the pin and slot connection.

The rod 128 extends upwardly alongside the steering column to a point just below the steering wheel 132. Secured to this upper end is a handle 133 extending to the right end of the steering wheel as viewed when the driver is sitting behind the wheel. The upper end of the rod has bearing in a bracket 134 and a spring 135 cooperates with this upper end to normally bias the rod so that the pin 129 at the lower end will be connected with the arm 124. If it is desired to connect the lower end of rod 128 to arm 121, this is accomplished by raising up on handle 133 against the bias of spring 135. The bracket 134 has a portion extending outwardly and above the center of the steering column and in this bracket is a slot 136 in the form of a lower case "h." The bracket is provided with four markings "Hi," "R," "N," and "Lo" to indicate the different conditions of the transmission as determined by the position of the handle 133. "Hi," "R" and "Lo" are opposite ends of legs of the slot, and "N" is at the center of the slot where the legs join each other. Cooperating with the h-slot is a pointer 137 which extends out from the hub of handle 133.

The bracket 125 at the lower end of the steering column also has mounted thereon a primary shut-off valve 138 comprising a cylinder 139 mounted on the bracket and a cylindrical valve element 140 formed as an extension of the hub of arm 124. This valve element is provided with a slot 141 for connecting two ports 142 and 143 in one position and disconnecting them when in another position. The port 142 is connected to conduit 88, previously referred to, and has the conduit connected to the manifold of the engine. The port 143 is connected to a conduit 144 which is connected to the manifold. The valve 138 is normally in closed position except when arm 124 is rotated by handle 133 to a position to actuate the arm 41 in a clockwise direction.

There is also provided an interlocking mechanism for preventing low and reverse gears from being engaged whenever it is desired to employ the second and high speed gears and vice versa. This interlocking mechanism (see Figures 4, 6 and 17) comprises a member 145 lying between the shafts 25 and 29 on the interior of the closure plate and pivotally mounted on said plate by a pin 146. The member 145 is provided with a bore 147 in which is positioned a spring 148 acting on balls 149 and 150 to press them apart. Ball 149 is adapted to cooperate with recesses 151, 152 and 153 in a flange on arm 27 carrying shifting fork 28 to yieldably hold said fork in its different positions. Ball 150 is adapted to cooperate with recesses 154, 155 and 156 in a flange on arm 31 to which the gear shifting fork 32 is pivoted to yieldably hold said fork in its different positions. When the gearing is in neutral, ball 149 is in the central recess 152 and ball 150 is in central recess 155. Under these conditions the interlocking member 145 has some pivotal play between the confronting flat surfaces adjacent the neutral recesses 152 and 155. When the shifting fork 28 is moved to either of its operative positions, member 145 is pushed against the flat surface on the flange of arm 31 by the camming action of the flat surface on the flange of arm 27 and is held in this position by the contour of the flange on opposite sides of the recess 151 or 153 depending on which ratio is active. When the shifting fork 32 is moved to either of its operative positions, member 145 is forced in the opposite direction against the flat surface on the flange of arm 27 by the camming action of the flat surface on the flange of arm 31 and is held in this locked position by the flange contour on opposite sides of recess 154 or 156 depending on which ratio is active. Thus it is seen that the flat surface of the shifter fork arm being moved to an active position operates to force the interlocking member against the flat surface of the inactive shifter fork arm, said interlocking member being held in its locked position to prevent movement of the inactive shifter fork arm by the flange contour of the active shifter fork arm.

In addition to this interlocking structure, member 145 is provided with a laterally projecting pin 157 which is adapted to lie adjacent the hub of arm 42 carried on shaft 40. This hub is provided with a recess 158 which is so positioned that pin 157 can engage the recess when the shifting fork 32 is in its neutral position and said arm 42 is moved to its neutral position as determined by the setting of the gear shift handle 133 mounted adjacent the steering wheel. If the gear shifting fork 28 is moved to an operative position, then pin 157 will be caused to engage recess 158 by the flat surface camming action of flange arm 27 against interlocking member 145. Consequently arm 42, shifting fork 32 and its associated neutralizing levers 33 and 34 will be locked in their neutral positions by the pin 157 and member 145 and held in their locked condition by the contour of flange arm 27 as long as either low or reverse speed ratio is active.

Referring now to the operation of my improved control mechanism, the parts thereof will be in the positions shown in Figures 1, 2, 4 and 18 when the gearing is in neutral or inoperative position. Under these conditions the finger 137 associated with the shifting handle will be opposite the point marked "N" on the bracket. The primary shut-off valve 138 will be closed as will also the secondary shut-off valve. The distributing valve will be in a position where both ends of the fluid motor will be connected to atmosphere, this position of the distributing valve being determined by the action of the plunger 76 and V-shaped nose 77.

If it is now desired to place the gearing in reverse speed ratio, this is accomplished by depressing the clutch pedal (in order to disconnect the gearing from the engine) and then pulling up on the handle 133 against spring 135 and rotating it in a counter-clockwise direction as viewed by the driver. This will move the pointer 137 into the end of the leg marked "R." When the lever is pulled up, rod 128 is so positioned that it will be connected to arm 121 at the lower end of the steering column. Rotation of shaft 128 by the handle will result in arm 26 being rotated in a clockwise direction. This will cause the combined low and reverse gear to be moved rearwardly from its neutral or inoperative position and to a position where it can engage idler gear 14. Reverse gear ratio is now operative and if the clutch is re-engaged, the vehicle will be moved rearwardly. When the gearing is in reverse speed ratio, the interlock member 145 will function to prevent any possibility of the high or second speed ratio shifting fork from being moved accidentally or otherwise as well as arm 42.

If it is desired to place the gearing in low speed ratio, the main clutch is disengaged by depressing the clutch pedal and then the handle 133 so moved as to place the pointer in the end of the leg of the H-slot marked "Lo." This causes the arm 26 to be rotated in a counter-clockwise direction and thus moves the combined low and reverse gear 16 forwardly to a position where it engages the gear 12. The transmission is now in low speed ratio and when the clutch pedal is released to re-engage the clutch, the vehicle will be moved forwardly.

Thus it is seen that the combined low and reverse gear 16 is moved solely by manual effort in order to obtain either low or reverse speed ratio. This method of operation is not burdensome on the driver since these two speed ratios are not employed as often as the second and high speed ratios of the gearing.

When it is desired to employ second or high speed ratio, the clutch pedal is depressed in order to disengage the clutch. The extent of depression of the clutch pedal should be beyond the disengaged position of the clutch marked "A" and to the position marked "B" as shown in Figure 1. The handle 133 is now moved to place the pointer 137 in the end of the leg. When the pointer 137 is opposite the position marked "N," spring 135 will bias the rod 128 downwardly so that the rod is connected to arm 124 by means of pin 129. Thus the pointer is in a position to move directly to the end of the slot marked "Hi" by a mere rotation of handle 133 in a counter-clockwise direction. Movement of the handle under these conditions will open the primary shut-off valve 138 so that the manifold will be in communication with conduit 88. The movement of the handle also causes the arm 41 to be rotated in a clockwise direction, as viewed in Figure 1. This results in arm 42 secured to the interior of shaft 40 being rotated in a clockwise direction and to the position indicated in Figures 8 and 11. The pin 86 on lever 42 will move into slot 85 of the short arm 84 and rotate this arm so as to place valve element 58 of the secondary shut-off valve in open position shown in Figures 9 and 12. This places the cross passage 89 in the valve element in alignment with passage 87 to thus connect this passage to passage 90.

The depressing of the clutch pedal to the position marked B in Figure 1 causes pin 48 carried by arm 47 of the clutch shaft to engage and rotate the short arm 45 and move it to the dotted line position marked B in Figure 23. The rotation of the short arm 45 rotates arm 46 in a counter-clockwise direction, as viewed from the exterior of the closure plate. This moves the plunger 76 to the left carrying with it the finger 79. Pin 80 on the end of this finger will be caused to move into engagement with recess 64 on the double arm member 62. Movement of pin 80 into recess 64 is brought about by the V-shaped selecting cam 67 carried by arm 66. The apex of this cam lies above pin 80 due to the fact that spring 72 is effective to cause arms 66 and 70 to be in their upper positions when the gearing is in neutral position, as viewed in Figure 4. The movement of plunger 76 and finger 79 to the left results in the finger rotating the valve element 56 of the distributing valve in a clockwise direction, as viewed from the exterior of the closure plate, and to the position shown in Figure 9. This position of the valve element 56 results in the lower end of the cylinder of the fluid motor to be in communication with passage 90 which is in communication with the manifold due to the open position of the two shut-off valves. The upper end of the cylinder of the fluid motor is caused to be connected to the atmosphere by the indicated position of the valve element. Under these conditions the piston 103 of the fluid motor is pulled downwardly by the action of differential pressures and arm 30 is rotated in a clockwise direction, as viewed in Figure 1. The movement of the arm causes the shifting fork 32 to be moved rearwardly and to carry with it collar 21, thus connecting gear 17 to the driven shaft and causing the second speed ratio to be operative.

When shifting fork 32 is moved rearwardly, pin 73 (carried by the fork) engages arm 71 and rotates this arm in a counter-clockwise direction, as viewed in Figure 8. This so positions arms 66 and 70 that the V-shaped selecting cam 67 will be in the position shown in Figure 8. Also, the moving of the shifting fork to second speed ratio position causes lever 33 to be moved from its neutral position, shown in Figure 5, to its position shown in Figure 8. In this latter position it is noted that the lever is spaced from pin 43 on arm 42. When the gear is in second speed position the interlock member 145 functions to hold gear shifting fork 28 in its neutral position and prevent any accidental movement.

If the clutch pedal is now released, the vehicle will be moved forwardly by power being transmitted through second gear ratio. Release of the clutch pedal permits arms 45 and 46 to return to their normal positions, thereby releasing plunger 76 and causing nose 77 to act on the double arm member 62 and, by reason of the V-shaped recess 65, rotate this member so that the valve element 56 of the distributing valve will again be in the position shown in Figure 1 wherein passage 90 will be cut off from communication from the lower end of the power cylinder and both ends of the power cylinder will be connected with atmosphere.

If it is now desired to place the change speed gearing in high speed ratio, that is, direct drive, all that is necessary is to press the clutch pedal to the position marked B and then release it. The handle 133 is not moved in any manner whatsoever. The depressing of the clutch pedal causes arm 47 to again move the plunger 76 to the left carrying with it finger 79. Since the apex of the V-shaped selecting cam 67 is now below pin 80, the pin will ride into recess 63 of the double arm member 62 and cause rotation of the distributing valve in a clockwise direction to the position indicated in Figure 12. This will result in the lower end of the power cylinder being in communication with the atmosphere and the upper end of the cylinder in communication with the manifold since the two shut-off valves are still in open position. The piston of the power cylinder will then move from the lower end to the upper end under the action of differential pressures and cause the gear shifting fork 32 to be moved from its second gear ratio operative position to the high speed ratio operative position. Thus gear 17 is disconnected from the driven shaft and the driven shaft connected directly to the drive shaft.

As arm 30 is rotated by the power cylinder from its second speed position shown in Figure 8 to the high speed position shown in Figure 11, the depression 110 on the hub of the arm will pass beneath the extension 109 of the restricting valve 107. When arm 30 is in a position so that the extension is in the recess, the gear shifting fork will be in its neutral position where neither the second nor high speed ratios will be effective. The restricting valve 107 will always close off passage 90 under these conditions and thus cause the amount of air being drawn out of the upper end of the power cylinder to be diminished. Consequently, the piston will not move rapidly at this time. This slows up the rate of movement of the shifting fork when it passes through neutral position. This is of considerable advantage since it permits some time for the synchronizing elements associated with the cooperative clutch teeth to be operative and bring the speeds of the teeth to approximate synchronization and thereby permit easier engagement. If there were no slowing of the rate of movement of the shifting fork from second speed position to high speed position, injury to the synchronizing means would result.

When the clutch pedal is released, the vehicle can be driven in high speed ratio. Release of the clutch permits plunger 76 to be again positioned as shown in Figure 4 and thus cause the valve element 56 of the distributing valve to assume its position where passage 90 is cut off and both ends of the power cylinder are in communication with the atmosphere. The movement of the shifting fork to the high speed position moves pin 73 away from arm 71 and, consequently, spring 72 will move arms 66 and 72 to the positions indicated in Figure 11. The apex of the V-shaped selecting cam 67 will thus be above pin 80 whereby when the plunger is again moved to the left, pin 80 will move into engagement with recess 64 and rotate valve element 56 of the distributing valve to the position shown in Figure 9. The movement of the shifting fork to the high speed position also carries with it the lever 34. Thus both levers 33 and 34 will be spread apart as shown in Figures 8 and 11.

If, in driving the vehicle in high speed ratio, a condition is encountered where it is desired to again obtain second speed ratio, as, for example, in going up a hill or after slowing down at an intersection, all that need be done to obtain second speed ratio is to depress the pedal to the position marked "B." This will cause plunger 76 to be moved to the left, thereby operating the valve element 56 of the distributing valve in a manner already described to cause the power cylinder to shift the shifting fork to the second speed position. The restricting valve 107 will be operative during the period that the sihfting fork moves through neutral position, thus slowing down the rate of movement of the shifting fork and permitting time for operation of the synchronizing means. When the clutch pedal is released, the valve element 56 will assume the position placing both ends of the power cylinder in communication with the atmosphere. The parts are now so positioned that subsequent depression of the clutch pedal to the position "B" will result in placing the transmission in high speed ratio. Thus it is seen that the operator of the vehicle can alternately obtain second and high speed ratios as desired by merely depressing the clutch pedal. He need not at any time touch the handle 133 on the steering column. When the gearing is in high speed ratio, the only gear ratio which will probably be subsequently used will be second speed ratio. If the gearing is in second speed ratio, the speed ratio most likely to be used is high speed ratio and this is obtained by merely depressing the clutch pedal. Thus it is seen that the two speed ratios which are used most are quickly obtained without the use of any movement of the hand, only by a de-clutching and re-clutching operation. If it is desired to disengage the clutch without performing any shifting operation, the clutch pedal need only be moved to the position marked in "A."

When the handle is moved so as to place the pointer in the end of the leg marked "Hi" of the slot, second speed ratio will always be first obtained since the spring 72 normally positions the arms 66 and 70 so that the V-shaped selecting cam 67 will cause the finger to rotate element 56 of the distributing valve to the position where the fluid motor will move the shifting fork to cause second speed ratio to be operated.

When shifting handle 133 is in a position where the pointer indicates "Hi" and it is desired to neutralize the gearing, this can be accomplished in several ways. The clutch pedal can be moved to the position "A" or "B" to disengage the clutch and the handle pulled downwardly so that the pointer is moved to the position "N." This causes arm 41 to be rotated back to its position as indicated in Figure 1. Initial counter-clockwise rotation of arm 42 first rotates valve element 58 to a position where passage 90 is cut off from passage 87 and connected to atmosphere by way of passage 92. Thus the power cylinder has both ends connected to atmosphere and no differential pressure is effective on the power piston notwithstanding the distributing valve element 56 may be in an operative position (clutch pedal at position "B") wherein one end of the cylinder would be connected to the source of suction if the valve element 58 were not shut off. At this point pin 86 begins to disengage from slot 85 of valve operating arm 84 since further rotation of valve element 58 is unnecessary and pin 43 now picks up lever 33 and moves it in a counter-clockwise direction. The connection between lever 33 and companion lever 34 also causes the latter lever to move in a clockwise direction. In other words, the levers are moved toward each other. If the shifting fork 32 should be in high speed condition, as shown in Figure 11, the movement of lever 34 will cause the shifting fork to be moved to its neutral position. Similarly, if the shifting fork is in second speed position, as shown in Figure 8, the movement of lever 33 will pick up the shifting fork and move it to its neutral position. Thus when shifting handle 133 is moved to the indicated neutral position, the power cylinder will be disabled and the gearing will be positively neutralized.

It is also possible to neutralize the transmission if in second or high speed condition by depressing the clutch pedal to the position marked "C." When this is done, pin 49 in the end of the clutch pedal actuated arm 47 will move to the end of slot 49 in connecting rod 51 and pick up this connecting rod at clutch pedal position marked "B" and rotate arm 41, shaft 40, and arm 42 with pin 43 to thus pick up lever 33 so as to neutralize the gearing in the same manner as though arm 41 were moved by the gear shift handle 133. If the clutch pedal is used solely to neutralize the gearing, the handle 133 will be automatically returned to its neutral position.

In addition to neutralizing the transmission by movement of either the handle 133 or the clutch pedal in the manner already indicated, it is possible to use the handle and pedal in conjunction with each other. In other words, if the operator finds some resistance in neutralizing the transmission when the handle is moved, he may also step on the clutch pedal and move the pedal to the position "C." Thus both the pedal and the handle work in conjunction with each other to rotate the arm 41 and neutralize the transmission. Whenever the handle moves back to its neutral position, the primary shut-off valve 138 as well as the secondary shut-off valve 58 will be closed. Thus it is seen that in the neutral position of the transmission two shut-off valves are operative to absolutely prevent the source of suction from communicating with the power cylinder. In addition to this, the distributing valve 56 is also positioned to prevent any communication when the clutch pedal is in clutch-engaged position, thus making three valves which are in position to cut off the source of suction from the fluid motor.

If it is desired to have the power cylinder assist in moving the shifting fork 32 to neutral position, this can be done by moving the clutch pedal to the position marked "B" and at the same time moving the handle toward neutral position. This operation will cause the power cylinder to begin to shift the shifting fork from its operative position through neutral and to its other operative position. The simultaneous movement of the handle with the movement of the pedal will close the primary and secondary shut-off valves and, consequently, the power cylinder will not carry the shifting fork past the neutral position as the power will become ineffective at that point due to the closing of the shut-off valves.

From the above description of my improved change speed gearing control mechanism it is seen that the structure is simple in operation and construction. The control valve and shifting mechanism are mounted on the closure plate for the gearing, thus making the mechanism very easy to install on existing automobiles which have steering column mounted hand levers for performing all the shifting operations. The control mechanism eliminates all hand shifting for second and high speeds, thus leaving the operator free to employ his hands for steering the vehicle or for other purposes. Also, the control mechanism is so arranged that whenever the shifting handle is moved to the position marked "N," the driver will know that the gearing is in neutral position. Thus there is no possibility of the driver not knowing the condition of the transmission, that is, whether it is neutral or in a gear ratio operative position. Since present change speed gears of the conventional type now have such second gear ratios that it is very seldom necessary to use low speed ratio except on heavy pulls, the control mechanism permits substantially all the shifting to be performed by merely operating the clutch pedal. To start the vehicle the driver need only place the handle so that the pointer in in "Hi" position. Second gear will then be caused to be operative when the clutch is depressed. When it is desired to place the transmission in high speed ratio, it is only necessary to depress the clutch pedal. Thus it is seen that when there are no heavy pulls, the operator need only make the initial setting of the handle and then perform the necessary shifting operations by merely depressing the clutch pedal to a point beyond the position where the clutch is disengaged.

In the modified plunger and selecting finger structure for actuating the distributing valve element 56 shown in Figures 24, 25 and 26, the same parts already described are indicated by the same numbers. The plunger 76' is biased outwardly by a spring 78', this spring having no function in maintaining the selecting finger normally in an axially aligned position. This function is accomplished by a small leaf spring 159 carried on the plunger and engaging a convex surface on the pivoted end of the selecting finger. When the finger is rotated out of its normal position shown in Figure 24, the leaf spring is deformed as shown in Figure 25, so that the spring tension will return and hold the selecting finger in axially aligned position when released.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for a change speed transmission provided with a member shiftable to two gear ratio operative positions and a central neutral position, control means for alternately shifting said member to its two operative positions including fluid power means having an element movable in opposite directions and means for causing said element to alternately move in said opposite directions solely at the will of the operator, a manual member movable from a normally inoperative position to another position for conditioning said control means to be operative, and mechanical connecting means between the manual member and the shiftable member which is operable when the manual member is moved back to its inoperative position for freeing said element by causing the conditioning to be inoperative and then positively moving the shiftable member to its neutral position from an operative position independently of operation of the control means.

2. In a control mechanism for a change speed transmission provided with a member shiftable to two gear ratio operative positions and a central neutral position, control means for shifting said member alternately and solely at will to its gear ratio positions including a power-operated member movable back and forth between two operative positions and through a central inoperative position, a manual member independent of the control means and having a normally inoperative position, means operable by said manual member when moved from its inoperative position to another position for conditioning said control means to be operative, and means operable when the manual member is moved back to its inoperative position for disabling the control means and for also freeing the power operated member and then subsequently causing the moving of the shiftable member and the power operated member from their operative positions to their central inoperative positions independently of any operation of the control means.

3. In a control mechanism for a change speed transmission provided with a member shiftable to two gear ratio operative positions and a central neutral position, control means for shifting said member including a fluid motor, a control valve and operator-operated means for actuating said control valve so as to cause the fluid motor to alternately shift the shiftable member to its operative positions at will, a shut-off valve for disabling the control means and insuring the fluid motor will be freed notwithstanding the control valve may be in an operative position, a manual member mechanically connected to the shut-off valve and having an inoperative position wherein the shut-off valve is closed and another position where the shut-off valve is open, and mechanical connecting means for positively moving the shiftable member to neutral position from an operative position independently of any operation of the control means when the manual member is moved back to its inoperative position after closing the shut-off valve.

4. In a control mechanism for a change speed transmission provided with a member shiftable to two gear ratio operative positions and a central neutral position, control means for shifting said member comprising a fluid motor, a control valve and means including a manually-operated member for actuating said control valve so as to cause the fluid motor to alternately shift the shiftable member to its operative positions at will, a shut-off valve for disabling the control means, a second manual member connected to the shut-off valve and having an inoperative position wherein the shut-off valve is closed, means for moving the shut-off valve to open position by a movement of the second manual member, means for closing the shut-off valve and positively moving the shiftable member to neutral position from an operative position when the second manual member is moved back to its inoperative position or by a movement of the first manually-operated member to a position other than that required to actuate the control valve.

5. In a control mechanism for a change speed transmission provided with a member shiftable to two gear ratio operative positions and to a neutral position, means for shifting said member, control means for said shifting means including a manually-operated member, means for so operating said control means by said manual member that the shiftable member will be moved alternately from one operative position to the other by successive movements of the manually-operated member, and means for so mechanically connecting the manually-operated member to the shiftable member that the said shiftable member will be placed in the neutral position by movement of the manually-operated member to a position other than that required to move the shiftable member to an operative position by the control means.

6. In a control mechanism for a change speed transmission provided with a member shiftable to two gear ratio operative positions and a neutral position, a fluid motor having its movable element directly connected to the member for shifting said member from one operative position to the other through the neutral position, a source of differential pressure, valve means for controlling said fluid motor, a manually-operated member for actuating said valve means, means for so controlling said valve means by successive like operations of the manual member from and return to a predetermined position that the fluid motor will alternately shift the shiftable member from one operative position to another, a shut-off valve between the source and the motor, and manual means for opening said shut-off valve and conditioning the controlling means so that the first named valve means may be operated by the first named manually-operated means.

7. In a control mechanism for a change speed transmission provided with a member shiftable to two gear ratio operative positions and a neutral position, a fluid motor for shifting said member, a source of differential pressure, valve means for controlling said fluid motor, a manually-operated member for actuatinging said valve means, means for so controlling said valve means by successive operations of the manual member that the fluid motor will alternately shift the shiftable member from one operative position to another, a shut-off valve, and means comprising a second manually-operated member so mechanically connected to the shut-off valve and the shiftable member that said valve can be closed and the shiftable member subsequently moved to neutral position independently of power by the fluid motor.

8. In a control mechanism for a change speed transmission provided with a member shiftable to two gear ratio operative positions and a neutral position, a fluid motor for shifting said member, a source of differential pressure connected for communication with the fluid motor, valve means for controlling the operation of said fluid motor by said source, a manually-operated member for actuating said valve means, means for so controlling said valve means by successive operations of the manual member that the fluid motor will alternately shift the shiftable member from one operative position to another, and means for moving the shiftable member by manual effort to neutral position by a movement of the manually-operated member to a position other than that required to control the valve means.

9. In a control mechanism for a change speed transmission having a shifting fork for shifting an element of the transmission in opposite directions to cause different speed ratios to be operative, said fork having a neutral position, a fluid motor for shifting said fork, control valve means, a pedal for controlling the valve means, and a connecting means between the pedal and shifting fork, said connecting means being operable by the pedal when moved beyond the position for normally controlling the valve for causing the shifting fork to be moved to its neutral position from an operative position.

10. In a control mechanism for a change speed transmission having a shifting member for shifting an element of the transmission in opposite directions to cause different speed ratios to be operative, control means for shifting said member including a pedal, said member having a neutral position, a hand lever, and means for so connecting the pedal and the hand lever to the shifting member that either can be employed by manual effort independently of manual effort on the other to move said shifting member to a neutral position from either operative position or either can be employed to assist the manual effort applied to the other in so moving said shifting member, the connection between said hand lever and the shiftable member being such that when said member is controlled by the control means including the pedal to thereby establish the different speed ratios, the hand lever will not be moved by the shiftable member, and the connection between the pedal and lever being such that when the pedal is employed to move the shiftable member to neutral position by manual effort it will also move the hand lever to its neutral position.

11. In a control mechanism for a change speed transmission provided with a member shiftable to two gear ratio operative positions and to a neutral position, means for shifting said member, control means for said shifting means including a manually-operated member, means for so operating said control means by said manual member that the shiftable member will be moved alternately from one operative position to the other by successive movements of the manually-operated member, a second manually-operated member, means controlled by said second manually-operated member when moved from one position to a second position for conditioning said control means to be operable by the first manually-operated member, and means operable when said second manually-operated member is moved to its first position to cause the conditioning means to be inoperative and then subsequently to positively cause by manual effort the shiftable member to be moved to its neutral position from either operative position.

12. In a control mechanism for a change speed transmission having a shifting member for shifting an element of the transmission in opposite directions to cause different speed ratios to be operative, said member having a neutral position, a fluid motor for shifting said member, control valve means, a manually-operated member for controlling the valve means so as to cause the speed ratios to be alternately operative, a shut-off valve, a second manually-operated member mechanically connected to said shut-off valve to open it by a predetermined movement, and means operable by the said second manually-operated member after it is moved to close said shut-off valve for causing the shiftable member to be manually moved to the neutral position.

13. In a control mechanism for a change speed transmission having a fluid motor the movable element of which is shiftable in opposite directions for causing either of two speed ratios to be operative, a source of differential fluid pressure, control valve means for connecting both ends of the fluid motor to atmosphere or either end to the source, means for normally positioning the valve means so that both ends of the fluid motor are connected to atmosphere, a manually-operated member, means operable by a reciprocable movement of the manually-operated member for so moving the valve means that one end of the fluid motor is connected to the source whereby the said motor will cause one speed ratio to be operative, means operable by a like successive reciprocable movement of the manually-operated member for so moving the valve means that the other end of the fluid motor is connected to the source whereby said motor will cause the other speed ratio to be operative, and means for restoring the valve means to its normal position after each reciprocation of the manually-operated member.

14. In a control mechanism for a change speed transmission having a fluid motor the movable element of which is shiftable in opposite directions for causing either of two speed ratios to be operative, a source of differential fluid pressure, control valve means for connecting both ends of the fluid motor to atmosphere or either end to the source, means for normally positioning the valve means so that both ends of the fluid motor are connected to atmosphere, a manually-operated member, connecting means between the manually-operated member and the valve means including selecting means for causing the valve means to be so operated by successive reciprocable movements of the manually-operated member that the ends of the fluid motor will be alternately connected to the source and thus cause the two speed ratios to be alternately operable at the will of the operator, a shut-off valve means between the source and the fluid motor, and means for manually closing said shut-off valve and subsequently neutralizing an operative speed ratio.

15. In a control mechanism for a change speed transmission having a fluid motor the movable element of which is shiftable in opposite directions for causing either of two speed ratios to be operative, a source of differential fluid pressure, control valve means for selectively connecting opposite ends of the fluid motor to the source, a manually-operated member, connecting means between the manually-operated member and the valve for operating the valve, means for causing the connecting means to be so connected with the valve that successive movements of the manually-operated member will result in the movable element of the fluid motor being moved alternately in opposite directions to thus cause the two gear ratios to be alternately operative at the will of the operator, and connecting means between the manually-operated member and the movable element for moving the movable element of the fluid motor to its central position by a movement of the manually-operated member to a position other than that necessary to operate the valve.

16. In a control mechanism for a change speed transmission having a fluid motor the movable element of which is shiftable in opposite directions for causing either of two speed ratios to be operative, a source of differential fluid pressure, control valve means including a single valve element for selectively connecting opposite ends of the fluid motor to the source, a pedal, connecting means between the pedal and the valve means for operating the valve element, means for causing the pedal and the connecting means to so move the valve element when the pedal is depressed and then released that one end of the fluid motor is connected to the source and for causing the pedal and connecting means to so move the valve element when the pedal is again depressed and then released that the other end of the motor is connected to the source, and means for conditioning the element of the valve means so as to disconnect both ends of the motor from the source when the pedal is in released position.

17. In a control mechanism for a change speed transmission provided with a member shiftable to two gear ratio operative positions, a fluid motor having a movable member connected to said shiftable member and movable in opposite directions for causing the two gear ratios to be operative, a source of differential fluid pressure, a valve for connecting said source to either end of the fluid motor, a second valve for shutting off the source of pressure, a pedal, means operable by successive reciprocable movements of the pedal for causing said first valve to alternately place opposite ends of the fluid motor in communication with the source of pressure to thus cause the shiftable member to be alternately moved to its gear ratio operative positions, a hand lever for opening said shut-off valve, and means operable by said hand lever after closing said valve for neutralizing the transmission.

18. In a control mechanism for a change speed transmission provided with one member shiftable to two positions for obtaining low and reverse speed ratios and a second member shiftable to two positions for obtaining second and high speed ratios, means including a manual member connected to shift the first shiftable member to either position, means for shifting the second member to either position and comprising a second manually-operated member, means controlled by the first manual member when placed in a single position other than a position operating the first named shiftable member for permitting the second named manual member to so control the second shiftable member that second and high speed ratios can be caused to be alternately operative by successive movements thereof and without movement of the first manual member, and means controlled by the first manual member for positively moving by manual effort the second shiftable member to an inoperative position from an operative position and independently of the second manually-operated member.

19. In a control mechanism for a change speed transmission having two gear ratios and provided with a member shiftable to either gear ratio operative position and to a neutral position, control means for shifting said member, a manual member independent of the control means and having a normally inoperative position, means operable by said manual member when moved from the inoperative position to another position to condition said control means for operation and when operated to cause the lower gear ratio to be first made operative and when subsequently operated to cause the gear ratios to be alternately operative all without movement of the manual member from said other position, and means operable when the manual member is moved back to its inoperative position for manually moving the shiftable member to neutral position from an operative position independently of operation of the control means and to also condition said control means so that when the manual member is again moved to a position permitting the control means to be operative the lower gear ratio will be caused to be operative upon initial operation of the control means.

20. In a control mechanism for a change speed transmission having more than two speed ratios and with two of the gear ratios controlled by a shiftable member, means for shifting said member to its two different operative positions and comprising a power-operated member and a control means for said power-operated member, a pedal for operating said control means so that successive movements of said pedal will cause the power-operated member to place the shiftable member in positions wherein the two speed ratios are alternately operative, manually operable means for disabling the power means and subsequently causing by manual effort only the shiftable member to be moved to neutralize a speed ratio if operative, and means operable by said manually operable means for manually controlling the operativeness of another speed ratio of the transmission when it is in a position causing the power-operated member to be disabled.

21. In a motor vehicle including a clutch and clutch disengaging means and a plural speed ratio transmission having a shifting member movable between two positions for causing the transmitting of power at different speed ratios, a power device having a reciprocating member connected to said shifting member, control means for said power device, means operable directly by the clutch disengaging means after each disengagement of the clutch for causing said control means to effect the actuation of said power device to effect movement of said shifting member between its two positions, manually operable means for controlling the operativeness of the control means and the power device, said control means and power device being inoperative when said manual means is in one position and capable of operation when said manual means is in another position, means controlled by the manual means when moved to the first named position for placing the shiftable member in neutral position by manual effort and means controlled by said manual means when moved to still another position for manually operating a change speed ratio different from the change speed ratios operated by the power device.

22. In a control mechanism for a change speed transmission provided with a member shiftable to two gear ratio positions, power means for shifting said member, control means for said power means, a pedal for so controlling said control means by successive reciprocations thereof that the power means will alternately shift the shiftable member from one operative position to another, manually-operated means for conditioning said control means so that said means can be controlled by the pedal to cause the power means to shift the shiftable member, and means controlled by a movement of the pedal beyond a position where the control means is operable to cause the conditioning means to be inoperable and to neutralize the transmission.

23. In a control mechanism for a change speed transmission provided with a member shiftable to two gear ratio positions, power means for shifting said member, control means for said power means, a pedal for so controlling said control means by successive reciprocations thereof that the power means will alternately shift the shiftable member from one operative position to another, hand-operated means for conditioning said control means so that said means can be controlled by the pedal to cause the power means to shift the shiftable member, means controlled by a movement of the pedal beyond a position where the control means is operable to thereby cause the conditioning means to be inoperable and to place the shiftable member in its neutral position, and means also controlled by the hand-operated means when returned to a non-conditioning position for neutralizing the transmission.

24. In a control mechanism for a change speed transmission provided with a member shiftable to two gear ratio positions and having associated therewith a main pedal-actuated clutch, power means for shifting said member, control means for said power means, means for so controlling said control means by successive reciprocations of the clutch pedal to a position beyond clutch-disengaged position that the power means will alternately shift the shiftable member from one operative position to another, hand-operated means for conditioning said control means so that said means can be controlled by the pedal, and means controlled by a movement of the clutch pedal beyond the position necessary to cause a shifting operation to be performed for causing the conditioning means to be inoperable and for subsequently neutralizing the transmission.

25. In a control mechanism for a change speed transmission provided with a member shiftable to two gear ratio positions and a neutral position and having associated therewith a main pedal-actuated clutch, power means for shifting said member, control means for said power means, means for so controlling said control means by successive reciprocations of the clutch pedal to a position beyond clutch-disengaged position that the power means will alternately shift the shiftable member from one operative position to another, hand-operated means for conditioning said control means so that said means can be controlled by the pedal, means controlled by a movement of the clutch pedal beyond the position necessary to cause a shifting operation to be performed for causing the conditioning means to be inoperative and for subsequently placing the shiftable member in its neutral position, and means for retaining said shiftable member in its neutral position notwithstanding movement of the pedal beyond clutch-disengaged position.

26. In a control mechanism for a change speed transmission having more than two speed ratios with two of the ratios being controlled by one shiftable member and at least another speed ratio being controlled by another shiftable member, power means for shifting said first shiftable member to cause either of the two speed ratios to be operative, control means operable solely at will for the power means, a manually operable lever having a neutral position, means for manually moving the other shiftable member by a movement of the lever from its neutral position, and means for conditioning the control means by a movement of the lever to a second position other than neutral and without manual establishment of either of the two speed ratios so that said control means can be controlled at will to cause the power means to alternately shift the shiftable member of the two speed ratios, said power means being inoperable by its control means whenever the lever is in the neutral position and said lever remaining in its said second position during the establishment of either of the two speed ratios by the power means.

27. In a control mechanism for a change speed transmission having more than two speed ratios with two of the ratios being controlled by one shiftable member and at least another speed ratio being controlled by another shiftable member, means comprising a pneumatically-operated mechanism and control means for shifting said first shiftable member to cause solely at will either of the two speed ratios to be operative, a manually operable lever having a neutral position, means for manually moving the other shiftable member by a movement of the lever from its neutral position, and means for conditioning the first means by a movement of the lever to a second position other than neutral and without manual establishment of either of the two speed ratios, so that said first means can be controlled to cause the pneumatically-operated mechanism to shift the shiftable member of the two speed ratios, said pneumatically-operated mechanism being inoperable when the lever is in neutral position and said lever remaining in its said second position during the establishment of either of the two speed ratios by the pneumatically operated mechanism.

28. In a control mechanism for a change speed transmission having a fluid motor the movable element of which is shiftable in opposite directions for causing either of two speed ratios to be operative, a source of differential fluid pressure, control valve means including a valve element movable alternately between two positions for connecting opposite ends of the fluid motor to the source, a movable member, and means for so connecting the member with the valve element that successive like movements of the member from and return to a predetermined position will cause alternate positioning of the valve element, said means including means conditioned by the position of the movable element of the fluid motor for predetermining the movement of the valve element by the said movable member when next moved.

29. In a control mechanism for a change speed transmission provided with a member shiftable to two gear ratio operative positions, power means for shifting said member, control means for said power means, manual means for controlling said control means so as to cause the power means to alternately shift the shiftable member from one operative position to another solely at will, other manually-operated means movable from one position to another for conditioning said control means only and without movement of the shiftable member so that said control means can be controlled by the first named manual means to cause the power means to shift the shiftable member, and means operable by said other manually-operated means for disabling the control means and for subsequently neutralizing the transmission by manual effort only when said manually-operated means is moved from its control means conditioning position.

30. In a control mechanism for a change speed transmission provided with a member shiftable to two gear ratio operative positions and a neutral position, a power cylinder including a movable element having a central position corresponding to neutral position of the shiftable member and movable in opposite directions for shifting said member, control valve means for said power cylinder, means comprising manual means for causing the controlling of said valve means so that the power cylinder will shift the shiftable member at will from one operative position to another, other manually operable means movable from one position to another without establishing either of the two gear ratios by manual effort for conditioning said control valve means so that said valve means can be caused to be controlled by the first named manual means in order that the power cylinder will shift the shiftable member, and means operable by a movement of said other manually operable means from its conditioning position for causing the valve means to be inoperative, said shiftable member to be subsequently caused to be placed in neutral position and the movable element of the power cylinder to be simultaneously placed in the central position of its stroke.

31. In a control mechanism for a change speed transmission having a fluid motor the movable element of which is shiftable in opposite directions for causing either of two speed ratios to be operative, a source of differential fluid pressure, control valve means including a valve element movable alternately between two positions for connecting opposite ends of the fluid motor to the source, a movable member, means for so connecting the member with the valve element that like successive moving and releasing of the member from and return to a predetermined position will cause alternate positioning of the valve element, and means for causing said valve element to be in a position so as to disconnect both ends of the motor from the source whenever the member is in one of its positions.

32. In a control mechanism for a change speed transmission having more than two speed ratios with two of the ratios being controlled by one shiftable member and at least another speed ratio being controlled by another shiftable member, power means for shifting said first shiftable member to cause either of the two speed ratios to be operative, control means for the power means, a manually operable lever having a neutral position, means for manually moving the other shiftable member by a movement of the lever from its neutral position, means for conditioning the control means by a movement of the lever to a second position other than neutral so that said means can be controlled to cause the power means to shift the shiftable member of the two speed ratios, locking means for the second shiftable member, and means operable when the lever is moved to condition the control means for causing said locking means to be operated and prior to any movement of the first named shiftable member.

33. In a control mechanism for a change speed transmission provided with a member shiftable to two gear ratio operative positions, power means for shifting said member, control means for said power means, manual means movable from an inoperative position to another position for controlling the operativeness of said control means so as to cause the power means to alternately shift the shiftable member from one operative position to another, another manual means having an inoperative position corresponding to a neutral condition of the gear ratios, and means for so conditioning the control means by a movement of said other manual means to another position other than its neutral position and without establishing either of the gear ratios that said control means can be controlled by the first manual means to cause at will the power means to alternately shift the shiftable member, said control means being made operable to cause the power means to function regardless of the sequence of movement of the first named manual means to its operative position and the movement of the second manual means to its said conditioning position and said other manual means remaining in its said other position during the functioning of the power means.

34. In a control mechanism for a change speed transmission provided with a member shiftable to two speed ratio operative positions, power means for shifting said member, control means for said power means, manual means movable from an inoperative position to another position for controlling the operativeness of said control means so as to cause the power means to alternately shift the shiftable member from one operative position to another solely at will, another manual means having an inoperative position, means for so conditioning the control means by a movement of said other manual means to another position that said control means can be controlled by the first manual means to cause the power means to alternately shift the shiftable member, said control means being made operable to cause the power means to function regardless of the sequence of movement of the first named manual means to its operative position and the movement of the second manual means to its said conditioning position, and means operable by said other manual means when returned to its inoperative position for first disabling the control means and for subsequently manually neutralizing an operative speed ratio by manual effort.

35. In a control mechanism for a change speed transmission provided with a member shiftable to two gear ratio operative positions and to a neutral position, means for shifting said member comprising a fluid motor having a movable element, means for connecting said movable element to the shiftable member so that the movable element of the fluid motor will be in a central position between its limits of reciprocable movement when the shiftable member is in neutral position and will cause the gear ratios to be operative when moved in opposite directions from said central position, control means operable at will for causing the movable element of said fluid motor to move in opposite directions, manual means having a normally inoperative position, means operable by said manual means when moved from said normally inoperative position for conditioning the control means so that it can control the fluid motor, and means operable by said manual means when returned to its normally inoperative position for first disabling the control means for the fluid motor, and then for manually restoring the movable element of the fluid motor to its central position and for manually moving the shiftable member to its neutral position.

36. In a control mechanism for a change speed gearing having a member shiftable to two speed ratio operative positions, a fluid motor having a movable element connected for shifting said member, a source of differential fluid pressure, control means including valve means having a normally inoperative position and other operative positions for connecting the fluid motor to the source to cause the movable element to be moved in opposite directions, a manually-operated member, means operable by a movement of the manually-operated member for so moving the valve means that the fluid motor will be operated to cause one speed ratio to be operative and operable by a like successive movement of the manually-operated member for so moving the valve means that the fluid motor will be connected to the source to cause the other speed ratio to be operated, said last named means embodying means controlled by the position of the movable element of the fluid motor for determining to which of the two positions said valve means will be moved by the manually-operated member, and means for restoring the valve means to its normal position after each movement of the manually-operated means.

37. In a control mechanism for a change speed gearing having a fluid motor the movable element of which is shiftable in opposite directions for causing either of two speed ratios to be operative, a source of differential fluid pressure, control valve means for connecting both ends of the fluid motor to atmosphere or either end to the source, means for normally positioning the valve means so that both ends of the fluid motor are connected to atmosphere, a manually-operated member, means operable by a reciprocable movement of the manually-operated member for so moving the valve means that one end of the fluid motor is connected to the source whereby said motor will cause one speed ratio to be operative and operable by a like successive reciprocable movement of the manually-operated member for so moving the valve means that the other end of the fluid motor is connected to the source whereby said motor will cause the other speed ratio to be operative, said last named means embodying means controlled by the position of the movable element of the fluid motor for determining which end of the fluid motor will be connected to the source by the valve means, and means for restoring the valve means to its normal position after each reciprocation of the manually-operated member.

38. In a control mechanism for a change speed transmission provided with a movable member for establishing two speed ratios, power means having a movable element connected to move the movable member to establish either of the speed ratios, control means for the power means comprising an element movable to two positions for causing the power means to establish the two speed ratios, a member for actuating the element of the control means, and mechanical selecting means including a pivoted oscillatable member rotatable to different positions for determining to which position the element of the control means will be moved by the actuating member when actuated.

39. In a control mechanism for a change speed transmission provided with a movable member for establishing two speed ratios, power means having a movable element connected to move the movable member to establish either of the speed ratios, control means for the power means comprising an element movable to two positions for causing the power means to establish the two speed ratios, a member for actuating the element of the control means, selecting means for determining to which position the element of the control means will be moved by the actuating member when actuated, and manually controlled means for first disabling the control of the power means by the control means and then subsequently neutralizing either of the speed ratios at will.

40. In a control mechanism for a change speed transmission provided with a movable member for establishing two speed ratios, power means having a movable element connected to move the movable member to establish either of the speed ratios, control means for the power means comprising an element movable to two positions for causing the power means to establish the two speed ratios, a member for actuating the element of the control means, selecting means for determining to which position the element of the control means will be moved by the actuating member when actuated, and means for disabling the power means at will notwithstanding the condition of the control means and prior to a neutralization of an established speed ratio.

41. In a control mechanism for a change speed transmission provided with a movable member for establishing two speed ratios, power means having a movable element connected to move the movable member to establish either of the speed ratios, control means for the power means comprising an element movable to two positions for causing the power means to establish the two speed ratios, a member for actuating the element of the control means, selecting means interposed between the actuating member and the control element for determining to which position the element of the control means will be moved by the actuating member when actuated, and means for operating the selecting means by the operation of the power means so that when one speed ratio is established the element of the control means can be actuated to a position to establish the other speed ratio by a movement of the actuating member.

42. In a control mechanism for a change speed transmission provided with a movable member for establishing two speed ratios, a fluid motor having a movable element connected to move the movable member to establish the speed ratios, conduit means for connecting the fluid motor to a source of fluid pressure different from atmosphere, valve means having a single rotatable element movable in opposite directions to two positions for controlling the operation of said motor, a member for actuating said valve means by a longitudinal movement, and selecting means comprising a pivoted oscillatable member between the actuating member and the valve element for determining to which position the element will be moved by the actuating member when actuated.

43. In a control mechanism for a change speed transmission provided with a movable member for establishing two speed ratios, a fluid motor having a movable element connected to move the movable member to establish the speed ratios, conduit means for connecting the fluid motor to a source of fluid pressure different from atmosphere, valve means having an element movable to two positions for controlling the operation of said motor, a member for actuating said valve means, selecting means for determining to which position the element will be moved by the actuating member when actuated, means for disabling the motor and freeing its element for movement and manually operable means for first operating the disabling means and then neutralizing either speed ratio at will by manual effort.

44. In a control mechanism for a shifting member of a change speed transmission, a fluid motor for moving said member to establish two different speed ratios, conduit means for connecting said motor to a source of fluid pressure different from atmosphere, control valve means including an element movable to two positions to cause operation of the motor, a movable actuating member, selecting means associated with the valve and the actuating member for determining to which position the actuating member when actuated will move the valve element, and means for disabling the fluid motor.

45. In a control mechanism for shifting a member of a change speed transmission, a fluid motor for moving said member to establish two different speed ratios, conduit means for connecting said motor to a source of fluid pressure different from atmosphere, control valve means including an element movable to two positions to cause operation of the motor, a movable actuating member, connecting means between the actuating member and the valve element including selecting means for determining to which position the member when actuated will move the element, and means for controlling the selecting means.

46. In a control mechanism for a change speed transmission provided with two gear ratios, a fluid motor for establishing either of said gear ratios, a source of differential pressure connected for communication with the fluid motor, valve means for controlling the operation of said fluid motor by said source, a manually-operated member for actuating said valve means, means for so controlling said valve means by successive operations of the manually-operated member from and return to a predetermined position that the fluid motor will alternately establish the speed ratios, and means for neutralizing either speed ratio by manual effort and by a movement of the manually-operated member to a position other than that required to control the valve means.

47. In a control mechanism for a change speed transmission having a fluid motor the movable element of which is shiftable in opposite directions for causing either of two speed ratios to be operative, a source of differential fluid pressure, control valve means including a valve element movable alternately between two positions for connecting opposite ends of the fluid motor to the source, a movable member, means for so connecting the member with the valve element that successive movements of the member from and return to a predetermined position will cause alternate positioning of the valve element, said means including means conditioned by the position of the movable element of the fluid motor for predetermining the movement of the valve element by the said movable member, and means for disabling the fluid motor.

48. In a control mechanism for a change speed transmission having a fluid motor the movable element of which is shiftable in opposite directions for causing either of two speed ratios to be operative, a source of differential fluid pressure, control valve means including a valve element movable alternately between two positions for connecting opposite ends of the fluid motor to the source, a movable member, means for so connecting the member with the valve element that successive movements of the member will cause alternate positioning of the valve element, said means including means conditioned by the position of the movable element of the fluid motor for predetermining the movement of the valve element by the said movable member, and common control means for first disabling control of the fluid motor by the control valve means and then causing neutralizing of a speed ratio when operative.

49. In a control mechanism for a change speed transmission provided with a member shiftable to two gear ratio operative positions and to a neutral position, means for shifting said member, control means for said shifting means including a manually controlled member, means for so controlling said control means by said manually controlled member that the shiftable member will be moved alternately from one operative position to the other by successive like movements of the manually controlled member from and return to a predetermined position, means comprising a second manually controlled member for causing the shiftable member to be moved to the neutral position from an operative position and independently of the first manually controlled member, and means controlled by the movement of the second manually controlled member and prior to causing the shiftable member to be placed in neutral position for disabling the control means.

50. In a control mechanism for a change speed transmission provided with a member shiftable to two gear ratio operative positions and through a neutral position, a double acting fluid motor having an element connected to the shiftable member, a source of fluid pressure different from atmosphere, conduit means connecting the source with both ends of the fluid motor, valve means associated with the conduit means and comprising a valve element movable to one position for connecting the source to one end of the fluid motor and the other end of the fluid motor to atmosphere and movable to another position for connecting the source to said other end of the fluid motor and said one end to the atmosphere so that the shiftable member can be moved alternately from one operative position to another, a member for actuating the valve element, selecting means to determine to which position the member when operated will move the valve element, a conditioning valve means also associated with the conduit means and having one position for connecting the source with the fluid motor through the control valve means and another position for disconnecting the source with the fluid motor and connecting an end of the motor with the atmosphere in the event that the control valve means is in a position where said end of the motor would normally be in communication with the source if said conditioning valve means were not in disconnecting position, and means for controlling said conditioning valve means.

51. In a control mechanism for a change speed transmission provided with a member shiftable to two gear ratio operative positions and through a neutral position, a double acting fluid motor having an element connected to the shiftable member, a source of fluid pressure different from atmosphere, conduit means connecting the source with both ends of the fluid motor, valve means associated with the conduit means and comprising a valve element movable to one position for connecting the source to one end of the fluid motor and the other end of the fluid motor to atmosphere and movable to another position for connecting the source to said other end of the fluid motor and said one end to the atmosphere so that the shiftable member can be moved alternately from one operative position to another, a member for actuating the valve element, selecting means to determine to which position the member when operated will move the valve element, a conditioning valve means also associated with the conduit means and having one position for connecting the source with the fluid motor through the control valve means and another position for disconnecting the source with the fluid motor and connecting an end of the motor with the atmosphere in the event that the control valve means is in a position where said end of the motor would normally be in communication with the source if said conditioning valve means were not in disconnecting position, means for controlling said conditioning valve means, and means for moving the conditioning valve means from its connecting position to its disconnecting position and for subsequently neutralizing an established speed ratio.

52. In a control mechanism for a change speed transmission provided with a member shiftable to two gear ratio positions, power means for shifting said member, control means for said power means, means for controlling said control means so as to cause the power means to alternately shift the shiftable member from one operative position to another, conditioning means for the control means a single manually operated means movable from one position for causing the conditioning means of said control means to be operative so that said control means can be subsequently controlled to cause the power means to shift the shiftable member to its two gear ratio positions, means operable by the manually operated means when again placed in the one position to first cause the conditioning means to be inoperative and subsequently for neutralizing the transmission by operator effort, and means other than the manually operated means for also neutralizing the transmission.

53. In a control mechanism for a change speed gearing having a member shiftable to two gear ratio operative positions, said member having a neutral position, means for shifting said member, control means for said shifting means including a manually operated member, means for so operating said control means solely by said manually operated member that the shiftable member will be moved alternately from one operative position to the other by successive movements of the manually operated member, a pair of companion levers positioned on opposite sides of the shiftable member, said levers forming no part of the means for alternately shifting the shiftable member to its operative positions including the moving of the member from an operative position to and through the neutral position by operation of the manually operated member, and means including means associated with the control means and operable independently of operation of the control means for moving said levers by manual effort toward each other to cause the shiftable member to be placed in neutral position.

54. In a control mechanism for a change speed gearing having a member shiftable to two gear ratio operative positions from a neutral position, means for shifting said member, control means for said shifting means including a manually operated member, means for so operating said control means solely by said manually operated member that the shiftable member will be moved alternately from one operative position to the other by successive movements of the manually operated member, a second manually operated member, a pair of companion levers positioned on opposite sides of the shiftable member and forming no part of the means for alternately shifting the shiftable member to its operative positions including the moving of the member from an operative position to and through the neutral position by operation of the first manually operated member, and means for causing the control means to be inoperative and for moving said levers toward each other by operation of the second manually operated member only and thereby place the shiftable member in neutral position by manual effort only.

GLENN T. RANDOL.